United States Patent Office 2,880,059
Patented Mar. 31, 1959

2,880,059
PRODUCTION OF URANIUM-CALCIUM FLUORIDE

Willis B. Tolley, Tucson, Ariz., assignor to the United States of America as represented by the United States Atomic Energy Commission No Drawing. Application September 14, 1956
Serial No. 610,039

12 Claims. (Cl. 23—14.5)

This invention deals with a method of preparing metallic uranium from its compounds, with a method of producing a uranium fluoride that is reducible by an alkaline earth metal, and it also deals with the method of reducing said uranium fluoride.

For the recovery of uranium from ores, the latter are usually digested with an acid, preferably nitric acid. In the case of nitric acid a solution of uranyl nitrate is formed. For the production of uranium tetrafluoride, the starting material used for the so-called bomb process wherein the uranium tetrafluoride is reduced to the metal in a closed system with an alkaline earth metal, such as magnesium or calcium, the uranyl nitrate solutions have been subjected to various processes.

In one of these processes the uranyl nitrate solution is boiled down and heated until the uranyl nitrate has been converted to uranium trioxide. The uranium trioxide is then reacted with cracked ammonia at about 650° C. whereby it is reduced to the uranium dioxide, and the latter is then treated with anhydrous hydrogen fluoride at a temperature of between 375° and 625° C. whereby uranium tetrafluoride is formed.

It has also been considered directly to precipitate the uranium tetrafluoride from uranyl nitrate solutions by introducing fluoride anions into the solution in the presence of a reducing agent whereby uranium tetrafluoride precipitates. The tetrafluoride obtained thereby was found to be a hydrated product, probably $UF_4 \cdot 2.5H_2O$, which was gummy and hard to filtrate. For the bomb reduction this fluoride has to be dehydrated by heating, and since the uranium fluoride obtained has a strong tendency to hydrolyze, dehydration has to be carried out in an atmosphere of hydrogen fluoride. The use of hydrogen fluoride at elevated temperature and also in the presence of the crystal water evolved brought about serious corrosion problems.

It is an object of this invention to provide a process of preparing uranium tetrafluoride in which the disadvantages just described are overcome.

It is thus an object of this invention to provide a process for the precipitation of a uranium fluoride from aqueous uranium salt solutions in which no serious corrosion problems exist.

It is another object of this invention to provide a process for the precipitation of a uranium fluoride which is readily filtrable in its hydrated form.

It is finally also an object of this invention to provide a process of precipitating a uranium fluoride from aqueous uranium-containing solutions and of reducing the precipitate to metallic uranium which is simple and inexpensive.

It was found that when a water-soluble calcium salt was present in the aqueous uranium-containing solution and fluoride anions were then added in the presence of a reducing agent, a double fluoride was precipitated whose formula was determined by X-ray examination as $UCaF_6 \cdot 1H_2O$. This double fluoride was not gummy but was crystalline and could be easily separated from the supernatant, for example by filtration. In controdistinction to the $UF_4 \cdot 2.5H_2O$ obtained in the process previously used, the double fluoride of this invention does not tend to hydrolyze, and therefore dehydration does not require an atmosphere of hydrogen fluoride but can be carried out in an inert oxygen-free atmosphere, for instance in argon gas. The uranium-calcium fluoride is readily reducible by alkaline earth metals in a bomb process.

The process of this invention thus comprises adding a water-soluble calcium salt and a suitable reducing agent to an aqueous solution of uranyl nitrate; adding fluoride anions to said solution whereby a hydrated uranium-calcium fluoride precipitates; separating the precipitate from the solution; heating the precipitate in an inert, oxygen-free atmosphere whereby the crystal water is removed; and heating the dehydrated double fluoride in mixture with an alkaline earth metal in an autoclave whereby metallic uranium is formed. The invention also comprises the preparation of the double fluoride alone, and it furthermore covers the reduction of uranium-calcium fluoride.

The precipitation of the double fluoride can be carried out by adding either a water-soluble fluoride or hydrogen fluoride; however, the latter is preferred because in this instance no other ions are introduced into the system. The precipitation with hydrogen fluoride takes place at room temperature so that corrosion is reduced to a minimum.

The hydrogen fluoride is preferably added in the form of aqueous hydrofluoric acid and this in an excess quantity of approximately 100% over the amount stoichiometrically required. A slow or step-wise addition of the hydrofluoric acid is preferred to its introduction in one batch because slow addition causes the precipitate to have a coarser particle size which makes filtration easier.

The optimum concentration of the hydrofluoric acid depends to a certain degree on the uranium concentration in the aqueous solution. For instance, a 48% hydrofluoric acid could be used for a uranyl nitrate solution of a concentration up to 0.3 M. For higher uranium concentrations the use of a more diluted hydrofluoric acid was advisable in order to obtain a filtrable precipitate. For instance, for a solution 1.48 M in uranyl nitrate the use of hydrofluoric acid as dilute as about 10% was necessary. Optimum results were obtained with hydrofluoric acid of a concentration between 10 and 11% and about 0.9 M uranyl nitrate solution.

All water-soluble calcium salts are suitable for the precipitation step. Calcium nitrate and calcium chloride, for instance, were found suitable, the latter being preferred. It is necessary to have the calcium present in at least the same molar quantity, preferably in the same molar quantity, as the uranium in order to obtain precipitation of the double salt.

Any reducing agent known to those skilled in the art that has a greater reduction potential than that of the couple $U^{VI} \rightarrow U^{IV}$ can be used; for instance, sulfur dioxide, stannous ions, cuprous ions and ferrous ions are suitable. These ions can be added in the form of any water-soluble salt, for instance as the chlorides. An excess of about 20% over the amount stoichiometrically required is advantageous.

The precipitate can be separated from the aqueous solution by filtration, centrifugation or decantation. The separated precipitate is then washed, for instance with an aqueous 0.5 M hydrofluoric acid, and dried with alcohol followed by ether. The precipitates so treated averaged a water content of about 4%. These precipitates are then completely dehydrated in an inert, oxygen-free atmosphere, for instance in argon gas, at a temperature of between 250° and 300° C. The products obtained thereby averaged a density of about 1.25 g./cm.$^3$.

The dehydrated double fluoride can then be reduced in an autoclave with an alkaline earth metal, such as magnesium or calcium. A so-called booster may be added which is a mixture of two substances which react exothermically and develop sufficient heat to start the reaction of the mixture after the latter has been brought to reaction temperature. A good booster, for instance, is the combination of iodine and calcium, and a quantity of from 0.5 to 1 mole of iodine per mole of uranium has given good results. It is of course understood that in this case the quantity of calcium added has to be increased accordingly because a part of it is consumed for the booster reaction. The reduction of the double fluoride in the bomb process is carried out the same way as the reduction of uranium-tetrafluoride. Details of this process are described, for instance, in the copending patent applications, Serial No. 514,210 (now abandoned), Serial No. 523,556 (now U.S. Patent No. 2,787,538, granted on April 2, 1957) and Serial No. 628,652, filed by Spedding et al. on December 14, 1943, February 23, 1944, and November 14, 1945, respectively.

In the following an example is given of the process of this invention for illustrative purposes and without the intention to have the scope of the invention limited to the details given therein:

*Example*

An approximately 10% hydrofluoric acid was slowly added, at room temperature, to a solution 0.9 M in uranyl nitrate and also containing 1 mole of calcium chloride per mole of uranium and ferrous chloride in a quantity of 20% excess over that stoichiometrically required; the hydrofluoric acid was used in excess quantity of 100%. A precipitate formed which was separated from the solution by filtration and washed with 0.5 mole hydrofluoric acid. The precipitate was then dehydrated in an atmosphere of argon gas at between 250 and 300° C. To the dehydrated salt iodine-calcium booster was added (1 mole booster per 1 mole uranium) and also the quantity of calcium necessary for the reduction. The charges were packed in a magnesia crucible and hermetically sealed in a steel bomb. The action was initiated by induction heating. The reaction spontaneously starts at a temperature of between 300 and 600° C., the exact temperature depending upon the specific conditions. A well-formed button of metallic uranium was obtained; the yield was 96.1%.

It will be understood that this invention is not to be limited to the details given herein and that it may be modified within the scope of the appended claims.

What is claimed is:

1. A process of producing a uranium fluoride suitable for reduction to the metal with alkaline earth metal, consisting of adding a water-soluble calcium salt and a reducing agent to an aqueous solution of uranyl nitrate; adding fluoride anions to said solution whereby hydrated uranium-calcium fluoride precipitates; separating said precipitate from the solution; and heating the precipitate in an inert, oxygen-free atmosphere whereby it is dehydrated.

2. The process of claim 1 wherein said calcium salt and the uranyl nitrate are present in the solution in about equimolar quantities.

3. The process of claim 2 wherein the calcium salt is calcium chloride.

4. The process of claim 1 wherein the reducing agent is added in an excess of about 20% over the amount stoichiometrically required.

5. The process of claim 1 wherein the reducing agent is a ferrous salt.

6. The process of claim 1 whereby the fluoride anions are added in the form of aqueous hydrofluoric acid.

7. The process of claim 6 wherein the hydrofluoric acid has a concentration of about 10% by weight.

8. The process of claim 6 wherein the hydrofluoric acid is added in an amount 100% in excess over that stoichiometrically required.

9. The process of claim 1 wherein the addition of fluoride anions is effected gradually and at room temperature.

10. The process of claim 1 wherein the uranyl nitrate is present in the aqueous solution in a concentration of 0.9 M and the hydrofluoric acid added has a concentration of about 10%.

11. The process of claim 1 wherein the inert atmosphere consists of argon gas and dehydration is carried out at a temperature of between 250 and 300° C.

12. A process of precipitating uranium values from an aqueous uranyl nitrate solution consisting of adding a reducing agent to said solution, adding to said solution a water-soluble calcium salt in an equimolar quantity in regard to the uranium values, and introducing hydrofluoric acid in gradual installments into said solution whereby uranium-calcium fluoride precipitates.

References Cited in the file of this patent

UNITED STATES PATENTS

| | | |
|---|---|---|
| 1,814,721 | Marden | July 14, 1931 |
| 1,826,806 | Marden | Oct. 13, 1931 |
| 2,756,125 | Abelson | July 24, 1956 |
| 2,780,518 | Gates et al. | Feb. 5, 1957 |
| 2,787,537 | Wilhelm | Apr. 2, 1957 |

OTHER REFERENCES

AEC Document MDDC–115, June 11, 1947, date declassified July 14, 1947, page 3.

MDDC–1673 pp. 5–11 Feb. 11, 1948.

Elliott: Phys. Rev., 76, 431–2 (1949).